US012567085B2

(12) United States Patent
George et al.

(10) Patent No.: US 12,567,085 B2
(45) Date of Patent: Mar. 3, 2026

(54) DYNAMICALLY GENERATING OFFER CODES

(71) Applicant: Checkmate Savings Inc., Santa Monica, CA (US)

(72) Inventors: Cody George, Los Angeles, CA (US); Rory Garton-Smith, Los Angeles, CA (US); Josh Bode, Melbourne (AU); Harry Dixon, Los Angeles, CA (US); Fletcher Ehlers, Sydney (AU); Elliot Rampono, New York, NY (US); Broderick Rampono, New York, NY (US)

(73) Assignee: Checkmate Savings Inc., Santa Monica, CA (US)

( * ) Notice: Subject to any disclaimer, the term of this patent is extended or adjusted under 35 U.S.C. 154(b) by 0 days.

(21) Appl. No.: 18/755,679

(22) Filed: Jun. 27, 2024

(65) Prior Publication Data

US 2026/0004321 A1     Jan. 1, 2026

(51) Int. Cl.
| | |
|---|---|
| *G06Q 30/0235* | (2023.01) |
| *G06Q 30/0207* | (2023.01) |
| *G06Q 30/0601* | (2023.01) |

(52) U.S. Cl.
CPC ..... *G06Q 30/0235* (2013.01); *G06Q 30/0239* (2013.01); *G06Q 30/0641* (2013.01)

(58) Field of Classification Search
CPC ........... G06Q 30/0235; G06Q 30/0239; G06Q 30/0641
See application file for complete search history.

(56) References Cited

U.S. PATENT DOCUMENTS

| | | |
|---|---|---|
| 2002/0077903 A1 | 6/2002 | Feldman |
| 2008/0091786 A1 | 4/2008 | Jhanji |
| 2010/0268602 A1 | 10/2010 | Rodriguez |

(Continued)

FOREIGN PATENT DOCUMENTS

WO     WO-2020/021376 A1     1/2020

OTHER PUBLICATIONS

Andre—"How Does Rakuten Work? A Review of the Popular Cashback App" Mar. 17, 2021, think.save.retire., https://thinksaveretire.com/how-does-rakuten-work/ (Year: 2021).*

(Continued)

*Primary Examiner* — Resha Desai
*Assistant Examiner* — Patrick Kim

(57) ABSTRACT

In one embodiment, a method includes providing, to a client device of a user, an interactive UI element on a webpage of a merchant and receiving an identification that the user has interacted with the UI element. The method further includes, in response to the identification that the user has interacted with the UI element, then determining, based on a profile of the user, whether the user qualifies for one or more merchant-specific campaigns associated with the merchant; in response to a determination that the user qualifies for one or more merchant-specific campaigns, then dynamically generating (1) a campaign-specific offer code and (2) an associated expiration duration for the campaign-specific offer code; and updating an offer-code database of the merchant with (1) the dynamically generated campaign-specific offer code and (2) the expiration duration for the campaign-specific offer code.

20 Claims, 6 Drawing Sheets

(56) References Cited

U.S. PATENT DOCUMENTS

| | | | |
|---|---|---|---|
| 2011/0035284 A1 | 2/2011 | Moshfeghi | |
| 2012/0209673 A1* | 8/2012 | Park | G06Q 30/02 |
| | | | 705/14.15 |
| 2016/0086222 A1 | 3/2016 | Kurapati | |
| 2017/0054711 A1 | 2/2017 | Shen | |
| 2017/0186027 A1* | 6/2017 | Hudson | G06Q 30/0238 |
| 2019/0019200 A1 | 1/2019 | Lew | |
| 2020/0265453 A1* | 8/2020 | Shiffert | G06Q 30/0255 |
| 2023/0186376 A1* | 6/2023 | Ortiz | G06F 9/451 |
| | | | 705/27.2 |

OTHER PUBLICATIONS

Andre—"How Does Rakuten Work? A Review of the Popular Cashback App" Mar. 17, 2021, think.save.retire., https://thinksaveretire.com/how-does-rakuten-work/ (Year: 2021) (Year: 2021).*

Final office action in U.S. Appl. No. 18/755,685, Jan. 22, 2025.

Golovacheva, K.S., et al. "Treating customers as individuals in online retail." (2022).

Non-final office action in U.S. Appl. No. 18/755,685, Oct. 1, 2024.

International Search Report and Written Opinion in International Application No. PCT/US2025/033150 Jul. 29, 2025.

Non-final office action in U.S. Appl. No. 18/755,685, Jul. 15, 2025.

\* cited by examiner

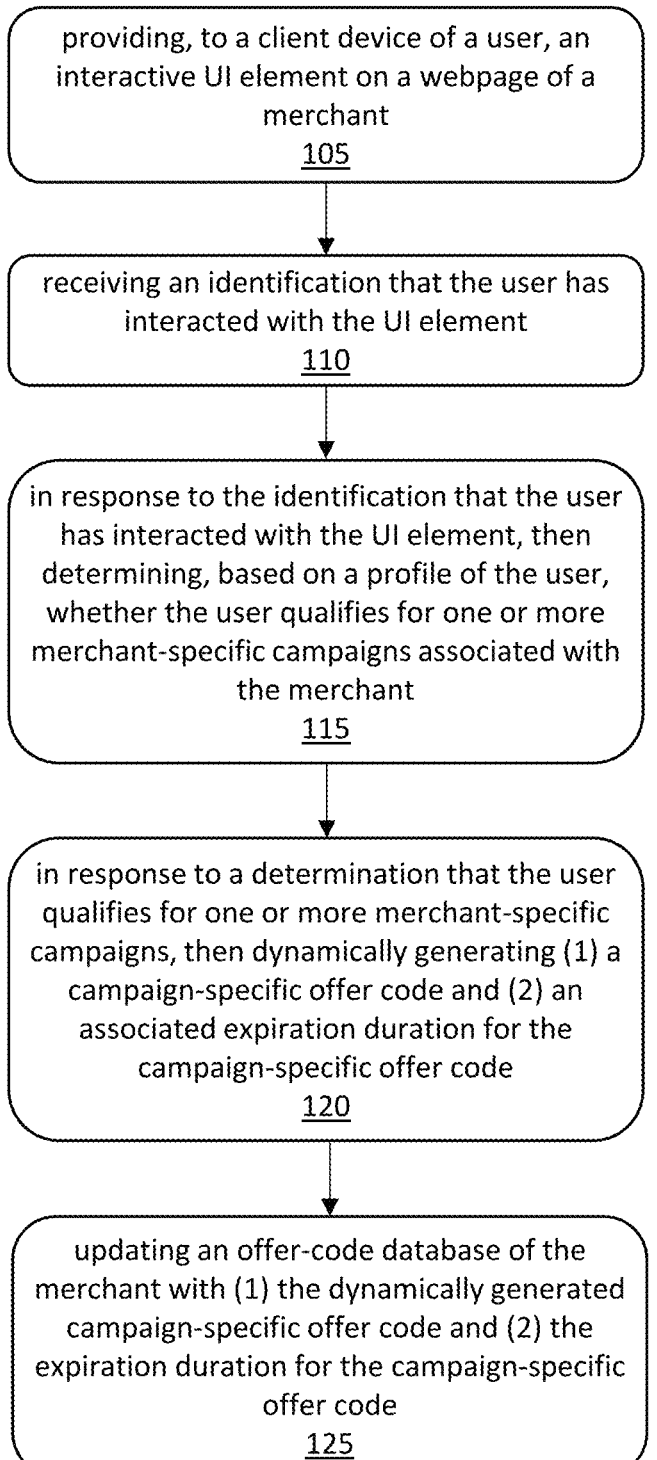

providing, to a client device of a user, an interactive UI element on a webpage of a merchant
105 receiving an identification that the user has interacted with the UI element
110 in response to the identification that the user has interacted with the UI element, then determining, based on a profile of the user, whether the user qualifies for one or more merchant-specific campaigns associated with the merchant
115 in response to a determination that the user qualifies for one or more merchant-specific campaigns, then dynamically generating (1) a campaign-specific offer code and (2) an associated expiration duration for the campaign-specific offer code
120 updating an offer-code database of the merchant with (1) the dynamically generated campaign-specific offer code and (2) the expiration duration for the campaign-specific offer code
125

Fig. 1

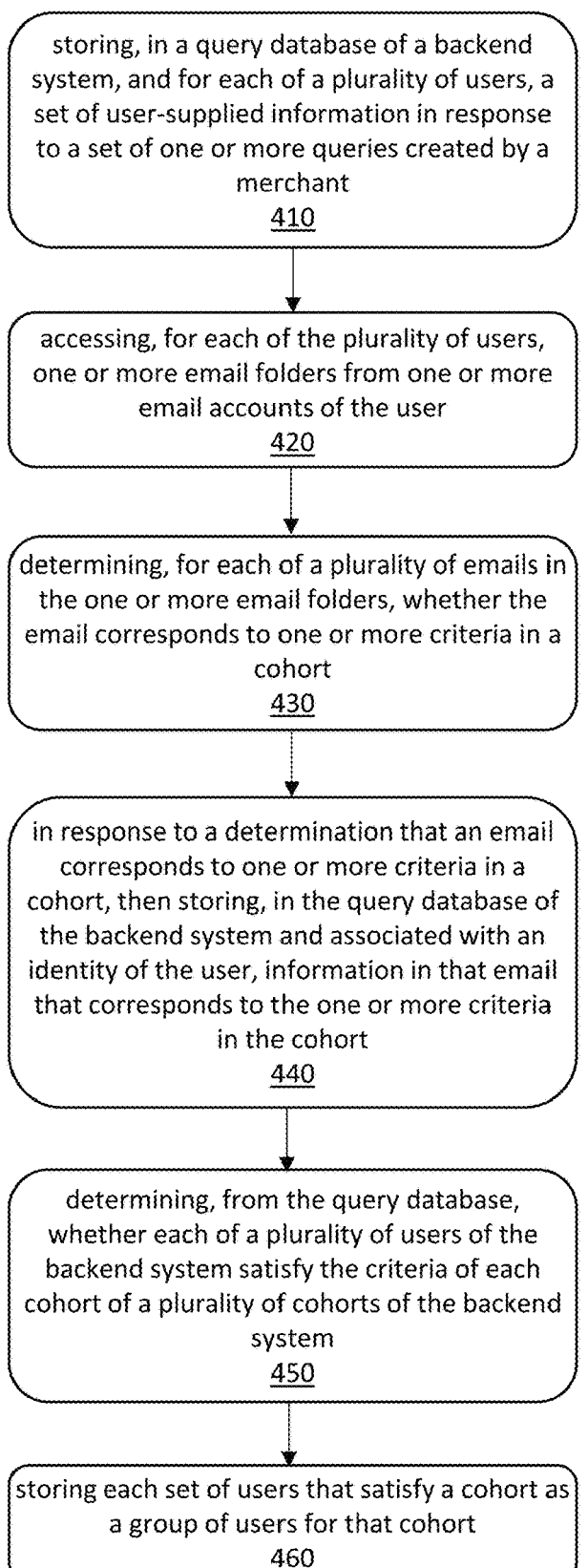

storing, in a query database of a backend system, and for each of a plurality of users, a set of user-supplied information in response to a set of one or more queries created by a merchant
410 accessing, for each of the plurality of users, one or more email folders from one or more email accounts of the user
420 determining, for each of a plurality of emails in the one or more email folders, whether the email corresponds to one or more criteria in a cohort
430 in response to a determination that an email corresponds to one or more criteria in a cohort, then storing, in the query database of the backend system and associated with an identity of the user, information in that email that corresponds to the one or more criteria in the cohort
440 determining, from the query database, whether each of a plurality of users of the backend system satisfy the criteria of each cohort of a plurality of cohorts of the backend system
450 storing each set of users that satisfy a cohort as a group of users for that cohort
460

Fig. 4

DYNAMICALLY GENERATING OFFER CODES

TECHNICAL FIELD

This application generally relates to dynamically generating offer codes.

BACKGROUND

People often purchase goods and services over the internet rather than at a merchant's physical store. For example, a user may access a merchant's website on an electronic device (e.g., a smartphone, personal computer, etc.), select goods or services the merchant is offering for sale that the user wishes to purchase (e.g., through a user interface (UI) on the merchant's webpage), electronically enter payment and contact information, and complete the transaction. The merchant then delivers the goods or services (e.g., by shipping physical goods to the customer's preferred shipping address), such that the shopping experience is performed electronically over the internet.

Many electronic transactions involve a user electronically adding items to an electronic cart, which electronically identifies the items a user has selected for purchase. When a user is done shopping on a merchant's website or in a merchant's application, then the user can access a checkout interface, which typically allows the user to view the total due for the cart items, enter shipping information and select shipping options, and enter payment information. A checkout UI may also include an element, such as a text box, for entering offer codes, which provide some benefit to the user, such as a discount on one or more goods in the cart, a free gift, etc. Only valid offer codes predetermined by a particular seller are associated with benefits for that seller; invalid codes or codes that are previously valid but are now expired do not result in any benefit to the user.

BRIEF DESCRIPTION OF THE DRAWINGS

FIG. 1 illustrates an example method for dynamically generating offer codes for a particular user.

FIG. 4 illustrates an example method for determining user qualifications for cohorts.

DESCRIPTION OF EXAMPLE EMBODIMENTS

A user may shop electronically by accessing a merchant's website or application on an electronic device (e.g., a smartphone, personal computer, etc.), select goods or services the merchant is offering for sale that the user wishes to purchase (e.g., through a user interface (UI) on the merchant's webpage), electronically enter payment and contact information, and complete the transaction Once a user accesses a merchant's domain (e.g., via a web browser or an application), the user is presented with content from the merchant's domain. This content may be provided, for example, as a static web page or a dynamic web page. For example, a user accessing a clothing merchant's domain typically can access content that identifies products the merchant sells, information about the merchant, and so on. A user can select products to purchase, typically by placing such products in a digital shopping cart, which the user can subsequently modify. When and if the user decides to purchase some products, the user typically accesses a checkout page (or pages), through which the user confirms the transaction and provides the corresponding transaction details (e.g., payment information, shipping information, contact information, etc.).

The prices for a merchant's products (or services) are usually identified by the web content provided to the user. A merchant's prices may include (usually temporary) adjustments to the merchant's typical prices in the form of sales or discounts, and these adjusted prices are provided to every user who accesses the web content. In addition, a merchant may provide offer codes to some or all users. Offer codes provide a benefit to the user, often in the form of a discount for some or all products in a user's shopping cart, but also in other forms (e.g., receiving a free gift with a certain purchase, receiving free shipping, etc.). Unlike a price adjustment, offer codes must be input in order to obtain the corresponding benefit. For example, a merchant's checkout page may include a UI element for entering offer codes. If an offer code is valid, then a corresponding benefit is provided, if applicable (e.g., if the user or the user's cart meets any condition(s) precedent to obtaining a benefit). If the offer code is not valid, then no benefit is provided. An offer code may be identified to every user who access the merchant's web content (e.g., an offer code may be published on the merchant's website), and/or offer codes may be provided only to a particular subset of users (e.g., an offer code may be sent to various users via email or text message, or may be provided to all users who attend a certain event (e.g., an in-store event), etc.).

Figure 2:
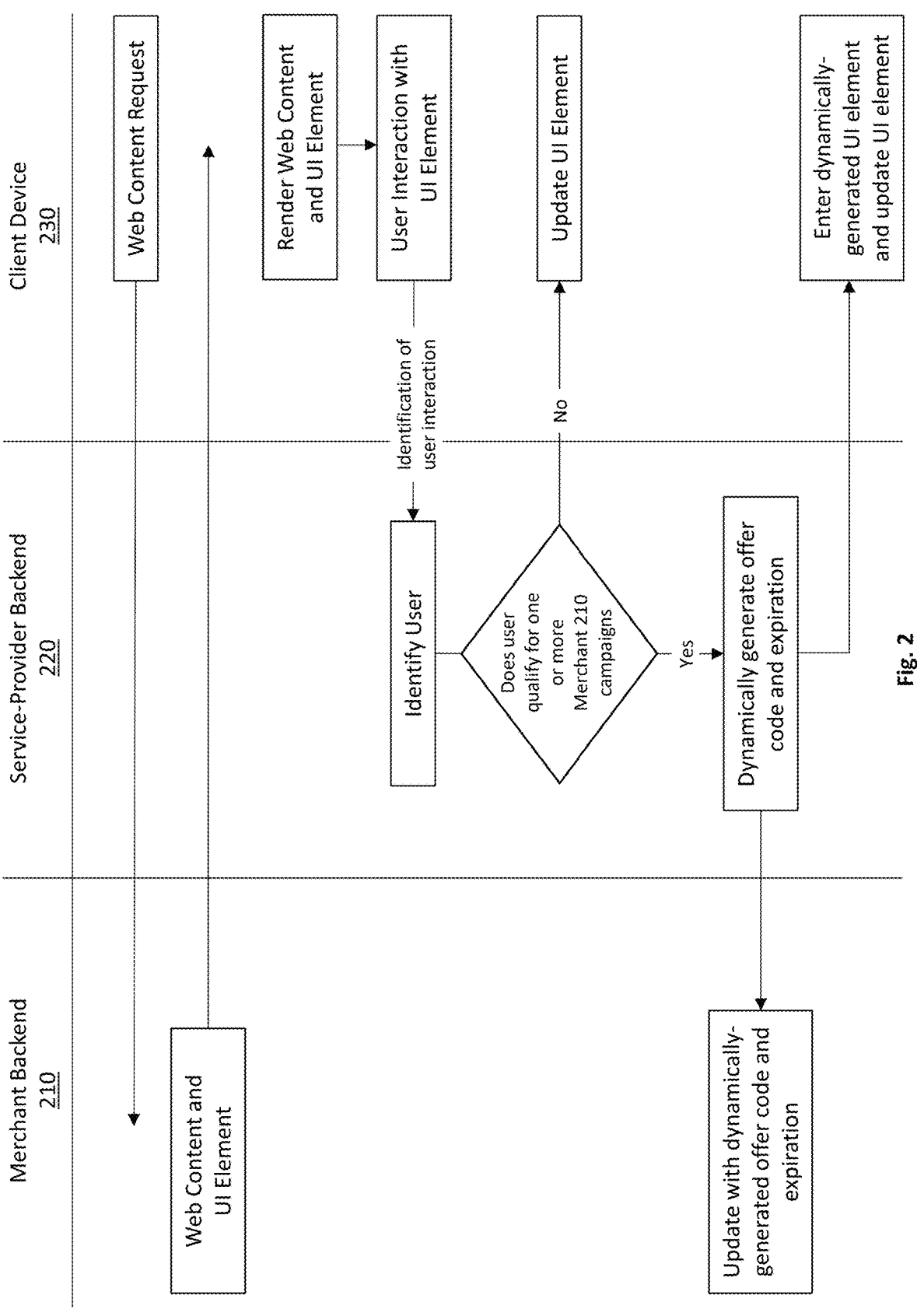
FIG. 2 illustrates an example system for implementing the steps of the example method of FIG. 1.
Figure 3A:
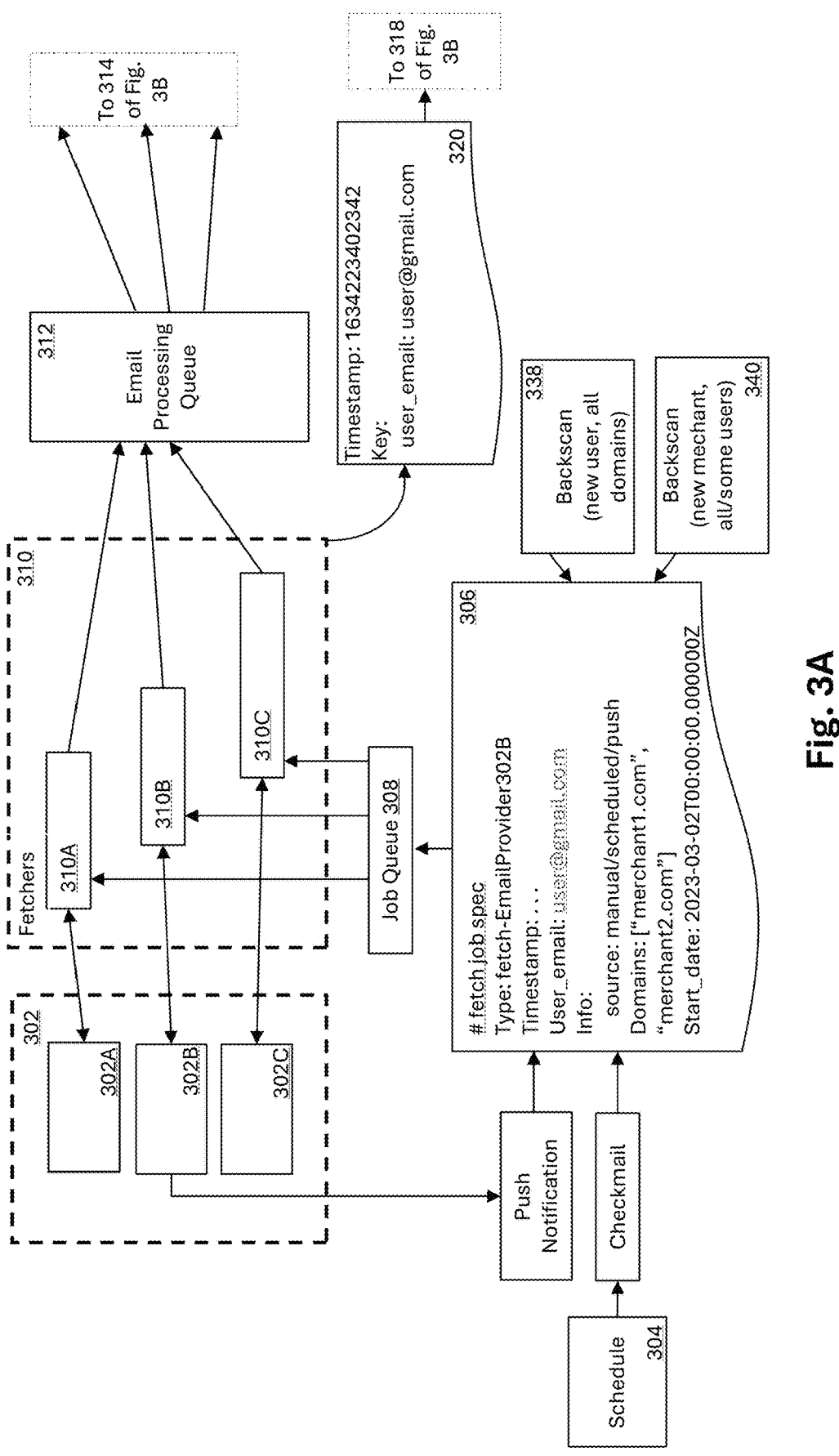
FIG. 3A and FIG. 3B illustrate an example back-end architecture of the system of FIG. 2.
Figure 3B:
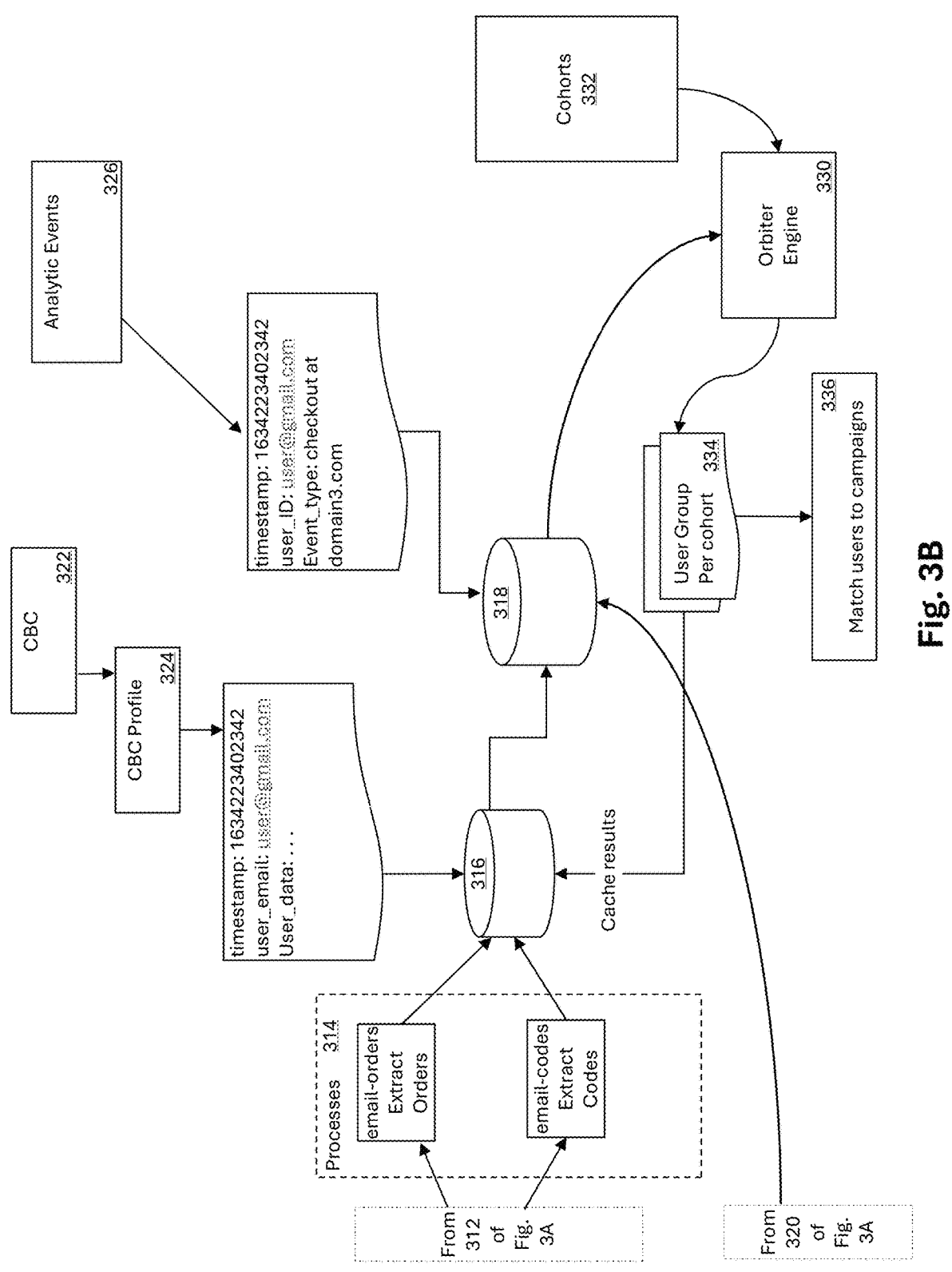

But offer codes are not dynamic, in that they are not generated in real time based on a particular user's attributes or user-specific criteria, nor are they unique to any actual user (e.g., many users receive and use the exact same code). In contrast, FIG. 1 illustrates an example method for dynamically generating offer codes for a particular user. FIG. 2 illustrates an example system for implementing the steps of the example method of FIG. 1, among other things, as explained in more detail below. FIG. 3A and FIG. 3B illustrate an example back-end architecture for performing certain steps of the example method of FIG. 1

Step 105 of the example method of FIG. 1 includes providing, to a client device of a user, an interactive UI element on a webpage of a merchant. The client device can be any suitable client device used for accessing web content, such as a smartphone, a tablet, a PC, a wearable device, a TV, etc. The webpage may be a conventional webpage, e.g., a URL accessed via a web browser, or may be any other type of internet content (e.g., web content accessed via an application). In particular embodiments, the interactive UI element may be presented to a user on a checkout page of the merchant associated with the domain hosting the web content. For example, once a user has finished shopping and reaches a checkout page, then the UI element may be presented to that user; however, the UI element may be presented earlier in the shopping experience, as well or in the alternative.

FIG. 2 illustrates a simplified architectural example in which server 210 associated with a merchant's backend (which may include multiple server devices) hosts the merchant's web content. Client device 230 submits a request for web content from the merchant's backend server 210. Server 210 provides web content that defines the UI element to client device 230, which renders the UI clement, along with other content defined by server 210. This disclosure contemplates that server 210 may provide web content in the form of HTML content, which may be rendered according to a Document Object Model defined by a browser of client device 230. The HTML provided by server 210 may reference one or more additional files, such as a JavaScript file, in one example of client-side rendering, or server 210 may provide a fully-built HTML page (e.g., by executing any referenced JavaScript on the server side) to client device 230, in one example of server-side rendering.

The UI element may be a button or other interactive portion that is surfaced to a user. The UI clement is coded in the document object model (DOM) based on the merchant's HTML, and therefore the merchant's backend web servers and associated web-page code can customize the appearance of the UI element, e.g., by specifying a particular size, shape, color, and so forth for the element. The UI element can include one or more of text, icons, or other graphics, each of which may be customized by a merchant, e.g., as identified by the corresponding DOM description for the UI element. In particular embodiments, backend 220 may provide software code for generating a UI element to merchant backend 210, which may then be customized by the merchant.

As explained more fully below, the UI element's appearance may change based on the state of an offer-code generation process. For instance, text displayed on the element may change based on the state. For example, a UI element may present an initial text, such as "click here for personalized savings!" when the state of the element is determined to be prior to any user interaction with the element. Moreover, as described below, the element may reflect a determination about the user's identity. For example, if the user is unknown to or unidentifiable by backend 220 then the element may have a generic appearance. However, if the user visiting the merchant's web content is associated with a particular identity, then a personalized message (e.g., "Welcome back! Click to save again" may be provided to the user via the UI element. However, as explained below, sensitive personal information may not be surfaced to the user at this stage, as the user is not yet fully authenticated with backend 220.

In particular embodiments, such as is illustrated in FIG. 2, a user does not need to install an extension (e.g., a web-browser extension) to obtain the functionality associated with the UI clement described herein. Instead, because the UI clement is defined by the DOM based on the HTML served by the merchant's backend, the user can simply request the merchant's web content (e.g., by visiting the merchant's website), and the UI element is surfaced along with the merchant's other web content. This approach improves compatibility and reliability, as implementing an extension that overlays a UI element over web content specified by a DOM can lead to problems with how the element is displayed and/or interacts with the web content, as the specifications of the DOM are not known a priori by the extension, and HTML from different merchants will result in different DOMs. Therefore, extension-based approaches may be difficult to scale to provide a reliable user experience across many different merchants, and the DOM-based approach for implementing a UI element may be a superior solution. However, this disclosure contemplates that particular embodiments may provide a UI element through a DOM or through an extension.

Step 110 of the example method of FIG. 1 includes receiving an identification that the user has interacted with the UI element. For instance, a user may click on (e.g., with an input device such as a mouse or via a touchscreen, etc.) the UI element or otherwise provide some input to select the UI element. The UI element may include software code that, when the UI element is selected by the user, connects to a service-provider backend 220, which includes one or more server devices operated by the service provider, an entity that is separate from the merchant operating merchant backend 210. For example, the UI element may include a URL link that, when activated, requests web content from backend 220.

Backend 220 provides web content to client device 230 in response to a user's interaction with the UI element. In particular embodiments, the content surfaced may depend on one or more of (1) the user's previous interaction with backend 220 (for example, whether the user has interacted with any UI element previously) and (2) the user's previous interactions with a UI element provided by that particular merchant. This information may be determined based on identifying information of a user, as explained below.

When a user visits a merchant's webpage, the merchant or an e-commerce vendor (e.g., SHOPIFY) may provide identifying information about a user. For example, the vendor may provide a client ID that is specific to the user/merchant combination, e.g., the client ID identifies both the user and the merchant that the user is visiting; different users visiting the same merchant will have different client IDs, and the same user visiting different merchants ay likewise be associated with different client IDs. Moreover, in particular embodiments, a vendor may provide a checkout token that uniquely identifies a particular shopping session. For example, if a user starts adding items to a cart, and/or the user reaches a checkout page, then that particular session may be assigned a session ID by the merchant or by the e-commerce vendor the merchant is using.

When a user interacts with a particular UI element, then identifying information about the user (e.g., the user's client ID and/or the session ID) may be transmitted to backend 220. This information may be used to determine whether that particular user has previously interacted with backend 220. However, because this information may be subject to spoofing attacks, backend 220 may also require authentication (e.g., encrypted login/password authentication) to backend 220. This authentication may be used to identify a user according to that user's account with backend 220. For example, as explained below, service-provider backend 220 may provide a number of services for users across many merchants (e.g., order tracking and delivery updates, etc.), and a particular user may have an account already associated with backend 220. In addition, a user may have an extension or application associated with the backend installed on client device 230 or on other client devices of the user, and therefore the identification/authentication process may have already occurred prior to the user interacting with the UI element.

Suppose a user interacts with a UI element and client device 230 is then served a landing page by backend 220. The landing page may include a login/authentication to backend 220. If a user does not have an account with that backend, then the user can create an account using the landing page, and the user is then associated with their user ID by backend 220.

When the user is creating an account with backend 220 for the first time, of if the user has an account but has not yet interacted with a UI element of a particular merchant, then the landing page surfaced to client device 230 by backend 220 (or a subsequent landing page) may include an input-based UI form for the user to enter select information about the user in response to merchant-defined queries. The UI form is determined, at least in part, by the merchant whose HTML defined the UI element the user clicked on. The merchant can define the queries (e.g., questions or drop-down menu options, etc.) made to a user on the UI form. By doing so, the merchant can obtain identifying information about a user that is relevant to campaigns the merchant is currently implementing, and these campaigns may define targeted offers.

For example, a merchant may implement custom campaigns that provide offers based on a user's profile (e.g., the user's age, sex, interests, income, education level, location, job, hobbies, plans (e.g., vacations, etc.), and so on). In order to properly identify and target users that meet specific campaigns, merchants need information about the user's visiting their websites, but such information is typically not available to a merchant, (1) because user's typically don't provide such information as part of the conventional e-shopping experience, and (2) also because legitimate privacy concerns by users have diminished (or eliminated entirely) the effectiveness of online tracking software and techniques. For example, many operating systems run by client devices include "do-not-track" settings that allow users to forbid websites and applications from tracking or collecting user's information, including usage information, and third-party cookies are depreciated by many browsers and operating systems. As a result, it is very difficult for merchants to implement targeted offer-code campaigns to users. The techniques described herein provide merchants with the ability to implement targeted offer-code campaigns to users, and indeed to dynamically generate user-specific and campaign-specific offer codes that are unique to particular user-merchant session. In addition, the techniques described herein provide for such dynamic generation based on information that is not affirmatively input by a user, e.g., in response to a form containing merchant queries.

When a user enters information in a UI form, that information is saved in backend 220. In particular embodiments, if information in a form is already stored in backend 220, then this information may be pre-populated in the form, and may be changed by the user. For example, different merchants may each have many different campaigns, and/or one merchant may have more than one campaign, but some queries may overlap across merchant campaigns. In addition, merchant campaigns may change over time, and these changes may result in new demographics or profile characteristics being identified by a merchant as relevant to a campaign, but some information from previous campaigns may still be applicable to new campaigns, as well. As another example, information separately stored by backed 220 may overlap with information for a particular merchant's campaigns, for example, because backend 220 may identify or estimate information about a user while providing other services (e.g., order tracking services, other e-shopping services, etc.) or, e.g., through an extension associated with backend 220 that can determine a user's browsing or shopping history.

In particular embodiments, as discussed throughout, the UI element may be stateful, in that the state of the offer-code generation process may be communicated to the UI element, and moreover, the UI element may reflect the current status. For example, an initial text of a UI element may be "Click here to save!" Once a user interacts with the element and is taken to a landing page associated with backend 220, then the UI element may be updated with text such as "Please complete the sign-in process." In particular embodiments, the UI element, e.g., as implemented by a client device's DOM, may include polling processes that communicate with backend 220 through an API endpoint on that backend, and this polling process may update the UI element with the current state of the offer-code generation process at the backend. The state may be specific, e.g., a UI clement may reflect the state at a granular level. For example, the UI element may say "Please authenticate to proceed" if the user is at a login page surfaced by backend 220, or may say "Please complete the form" if the user has not yet filled in their form reflecting merchant queries, or may say "only X questions to go!" if the user has completed all but X queries in the form. Thus, the UI clement may reflect the state of the process as that process proceeds via backed 220 and client device 230 interactions, even though the UI element is implemented by the DOM of client device 230 (based on the merchant's served HTML) and displayed along with web content from server 210.

Step 115 of the example method of FIG. 1 includes, in response to the identification that the user has interacted with the UI element, then determining, based on a profile of the user, whether the user qualifies for one or more merchant-specific campaigns associated with the merchant. As illustrated in FIG. 2, step 115 may be performed in real-time by backend server(s) 220, using the relevant information about the user (e.g., information corresponding to existing campaigns of the merchant with whom the user is shopping). Here, qualification is determined based on whether the user meets the criteria set for a given campaign; in general, this will often require meeting all requirements of a campaign, but alternative conditions may also be used (e.g., a user may qualify for a particular campaign if the user satisfied rules A, B, and C OR if the user satisfies rules A and D, and so forth). Campaign qualification and the corresponding qualifying conditions are established in advance by the merchant associated with server 210, and these qualifications and campaigns are provided to backend 220.

FIG. 3A and FIG. 3B illustrate an example architecture of backend 220 for determining whether a user qualifies for a merchant-specific campaign, among other things. This determination can be based on data from several different data sources, including (1) information provided by a user in response to merchant queries for a given campaign (e.g., user information input into a form that backend 220 surfaces to the user when the user interacts with a UI element or has previously interacted with a UI element) (2) information obtained from a user's email inboxes, as described more fully below and (3) analytic information that is based on analytic events, e.g., events that occur in a user's application associated with backend 220 or while using a browser with an enabled extension that is associated with backend 220.

Users have one or more email accounts with email providers 302, which are not part of backend 220 (e.g., email providers may be Gmail, Yahoo, Microsoft, etc.). Email providers 302 host email services for users, and backend 220 can access emails for a user through that user's account with various email providers 302. FIG. 3A illustrates two different ways of accessing email. In one example, email provider 302B provides a push notification when a new email enters a particular folder, typically the inbox. As another example, backend 220 may schedule 304 a periodic check of other email accounts a user has with email providers that do not provide push notifications, e.g., email providers 302A and 302C. When a push notification is received or when a scheduled email check occurs, then backend 220 executes a fetch request 306, which is placed into a job queue 308. For example, a fetch request may identify the user email account for whom the fetch request is performed for, a set of specific information to obtain from the fetch request (e.g., a set of one or more email-sender domains to search for emails for), a start and/or end date identifying the time range over which to search (e.g., the past hour, or from 2 years to 1 year ago, etc.), and an authentication token that authenticates backend 220 to the email provider.

Requests in job queue 308 are performed, e.g., periodically, and similar jobs may be grouped together, e.g., to reduce the compute resources necessary to perform the email fetch requests and to avoid rate-limiting from email providers 302 in response to numerous fetch requests.

Fetch requests from job queue 308 are performed by fetchers 310. The example of FIG. 3A illustrates a different fetcher (e.g., 310A, 310B, and 310C) for each email provider, as in practice, each email provider typically uses a different API to access their servers. Fetchers 310 perform the fetch jobs identified in job queue 308 for their respective email providers. The data obtained by the fetch requests, i.e., as defined by fetch request 306, are normalized to a single data template because different email providers format their emails differently. Normalized email data is placed into email processing queue 312, and processes 314 can then operate on this data. For example, processes 314 may include email order tracking (e.g., using the techniques described in U.S. Pat. No. 11,936,608, which techniques are incorporated herein by reference) and offer-code analysis (e.g., to identify offer codes provided directly by a particular merchant to a particular user). The results of processes 314 operating on normalized email data are stored in database 316.

As illustrated in FIG. 3A, in particular embodiments, and separately from processes 314, email data 320 can be obtained from fetchers 310 and placed into a query database 318. Email data 320 corresponds to information defined by merchant campaigns, while email data in email processing queue 312 corresponds to data pulled for, and used by, predetermined processes 314. For example, email data pulled for predetermined processes 314 may include order-tracking information (e.g., shipping updates and delivery-status updates), while email data 320 includes information corresponding to attributes defined by a cohort (e.g., a cohort associated with a merchant campaign). Such attributes may include the sender (i.e., domain) of an email, the date the email was sent, whether the email was read, and the other information from the email.

In addition to information parsed from user emails, query database 318 may include information from a user in response to merchant queries, e.g., as described above when a user interacts with a UI element and is presented with a UI form. User responses 322 to merchant queries are gathered and stored in a CBC profile 324 for that user, which may include information obtained from the user, e.g., during the offer-code generation process described herein. Information in user profile 324 is stored in database 316, which may also include demographic information supplied by the user when creating or updating an account with backend 220, and which also periodically updates query database 318 with information (e.g., user responses to merchant queries) relevant to any merchant campaign. Such updates may occur periodically or may be pushed to query database 318 when new data is written to database 316. In particular embodiments, if information in user profile 324 is inconsistent with existing information in database 316 for a particular user, then the inconsistent information in database 316 may be overwritten by the information in profile 324, e.g., information in profile 324 is given preference.

Another source of information for determining whether a user qualifies for a particular merchant campaign may come from analytical events 326. For example, a user having an account with backend 220 may use a corresponding application or a browser extension, and activities on these platforms (e.g., a user's browsing history, shopping history, purchase history, etc.) may be segmented and stored in query database 318. For example, if a user visits a checkout page associated with a particular domain, then that fact along with the domain, the user's identity, and the time that event occurred may be logged in query database 318. In particular embodiments, analytic-event updates to query database 318 may occur periodically, e.g., on a nightly or hourly basis.

In the example of FIG. 3B, Orbiter engine 330 determines groups of users of backend 220 who meet the definition of a cohort 332. A cohort is defined by a set of conditions, or rules, for one or more user attributes. A merchant's campaign defines a particular cohort, but cohorts may also be used apart from campaigns, e.g., to otherwise identify subsets of users.

A cohort defines the attributes that Orbiter engine 330 uses to determine groups of users of backend 220 that qualify for the cohort. A merchant can define the set of attributes for a particular campaign, and this set of attributes is stored in a database of cohorts 332. A cohort may include a cohort ID, a description (e.g., an alphanumeric description), and a set of criteria, which may include demographic criteria, criteria obtained from user emails, and criteria obtained from analytic events. The rules defining a campaign may be written in a domain-specific language, which is then converted into SQL using predefined translations. For instance, each rule or criterion in a campaign may be translated into a block of SQL, and each block of SQL may be concatenated using Boolean logic (e.g., ANDing each block if each rule must be met, and so on) to form a SQL query for a particular cohort. Orbiter engine 330 can then execute this SQL query on database 318 to define a user group that meets the cohort's definition. Cohorts and corresponding groups may then be matched to particular corresponding campaigns 336 to determine whether a user qualifies for a particular merchant campaign.

As an example, a cohort may include demographic requirements, such as the age of the user (e.g., that the user is over 40, or be part of GenZ, etc.), the gender, the location, the educational status, employment status, profession, interests, and so forth. A cohort may include requirements relating to the user's interactions with a merchant, its competitors (which may be defined by the merchant), or with other entities or activities, e.g., as defined by the merchant. For instance, a cohort may specify as a requirement that a user cannot have purchased a product from the merchant in the past, or must be a returning customer. Cohorts can combine rules, for example according to Boolean logic such as by ANDing or ORing rules together. For instance, a cohort may be defined as users who are part of Gen Z, who have bought sunglasses in the past years, and who have attended two or more music festivals or concerts in the past six months.

Cohort rules may include temporal information based on the specific interaction currently happening with a merchant, such as rules relating to specific items the user must have (or cannot have) in a current shopping cart with the merchant, a time of day, etc. Such information, such as information in a current shopping cart, may be passed by backend 210 or client device 230 to backend 220 when a user interacts with a UI element, so that this information can be stored by backend 220 (e.g., in database 318) and subsequently accessed by Orbiter engine 330 to determine compliance with particular cohorts. In particular embodiments, cohort rules may be based on a number of emails from a particular domain received by a user (e.g., over a predetermined time period), a number or percentage of emails from a particular domain that a user read or opened, and/or that an earliest email or most recent email from a particular domain was received between a certain date range (which may be defined by a preceding time interval (e.g., 1 month to 2 months ago)). In particular embodiments, cohort rules may be based on analytic events such as whether a merchant's website was previously viewed, whether a merchant's checkout was previously visited, whether those events occurred for merchant-defined competitors, etc. In particular embodiments, rules in a cohort may specify one or more timeframes during which analytic events must have or must not have occurred.

In particular embodiments, Orbiter engine 330 may run periodically to determine user groups 334 corresponding to existing cohorts 332. For example, Orbiter engine 330 may run on a daily basis, thereby determining each user group 334 that corresponds to a particular active cohort 332. This group information may be stored in database 316 and may be subsequently used to more efficiently perform step 115 of the example method of FIG. 1. For instance, if an existing user of backend 220 interacts with a UI element at a particular merchant's checkout page, then the user's qualifications for the merchant's campaigns defined in cohorts 332 would already be determined during the last run of Orbiter engine 330 (assuming that merchant's campaigns were defined in cohorts 332 prior to the engine's most recent execution, which would typically be the case). Therefore, backend 220 can perform step 115 by accessing the predetermined cohort results directly from database 316, and can then match the cohorts the user qualifies for to the merchant's campaigns. If the user matches one or more campaigns, then backend 220 can dynamically generate an offer code for the user, as explained more fully below. In this example, Orbiter engine 330 determined whether the user qualified for particular cohorts, including those corresponding to the merchant's active campaigns, but Orbiter engine did not need to be called in response to the user's interaction with the UI element, therefore saving real-time compute resources.

In particular embodiments, Orbiter engine 330 may run on demand, e.g., in real-time during the example method of FIG. 1, to determine whether a user qualifies for one or more cohorts, e.g., one or more merchant campaigns. For example, suppose a user interacts with a UI element on a merchant's webpage and is then taken to a landing page associated with backend 220. If the user does not have an account with backend 220, then the user can create one. But in this instance, databases 316 and 318 would not contain any information from the user's email accounts, from analytic events 326, or from any user responses to merchant queries (expect perhaps to the set of queries surface in response to the user's interaction that just occurred with the UI element). Therefore, these databases would at-most include information from the user's responses to a single set of merchant queries surfaced as a result of the user interacting with the UI element. Therefore, Orbiter engine 330 would not have run for that user, and would have little information to go on if it did run-Orbiter engine 330 would only be able to determine whether the user satisfied cohorts with rules that are completely defined by the user's responses to the merchant queries just surfaced to the user, and Orbiter engine 330 would not be able to determine the status of the user for cohorts that included rules for any richer information (e.g., email information or analytic events). Thus, Orbiter engine 330 must provide efficient, real-time cohort determinations for a new user in order to determine whether that new user qualifies for a campaign of the merchant with whom the user is interacting.

In order to determine whether a new user meets the requirements of cohorts 332, particular embodiments may perform an on-demand determination by backend 220, for example in response to a new user interacting with a UI element. For example, the user may create an account with backend 220, giving the backend access to one or more of the user's email folders from one or more email providers. In particular embodiments, backend 220 may prioritize acquisition of the user's information to efficiently identify whether the user meets the requirements of one or more cohorts. For example, backend 220 may perform the following prioritization process. First, Orbiter engine 330 may determine whether the user meets demographic requirements of the cohorts for the merchant that provided the UI element to the user; running on other cohorts can be delayed until needed (e.g., until the periodic run is performed). If the user does not qualify for any of the merchant's cohorts, then backend 220 may determine that the user does not qualify for any of the merchant's campaigns, and surface this information accordingly (e.g., as described below).

If the user qualifies for the demographic portion of one or more of the merchant's cohorts, then Orbiter engine 330 may check the remaining rules for those cohorts to determine what additional information is needed for that user. Orbiter engine 330 may then perform a backscan 338 across the user's email domains for the identified missing information. For example, suppose the user qualified for the demographic information of two of the merchant's cohorts: (1) a first cohort that also requires the user to (a) have not purchased anything from the merchant in the past 3 months and (b) have purchased something from a competitor merchant in the 18 months; and (2) a second cohort that requires the user to (a) have attended three or more live sporting events in the past year and (b) have not received a discount from the merchant in the past six months. Orbiter engine would then perform a backscan of the user's email domains for (i) emails from the merchant's domain in the past six months (which is sufficient to determine whether the user meets (1)(a) and 2(b)), (ii) emails from identified competitor domains for the past 18 months (sufficient to determine whether the user meets (1)(b)), and (iii) emails related to live sporting events over the past year (sufficient to determine whether the user qualifies for 2(a)). As a result, in this embodiment, Orbiter engine 330 determines in real-time whether the user qualifies for any campaigns for the merchant with whom the user is shopping, while reducing compute resources by focusing the real-time backscan only on cohorts that correspond to the merchant and only for those cohorts that the user has already met the demographic requirements for. Now that the user is onboarded with/has an account with backend 220, whether the user qualifies for other cohorts 332 can be determined during the normal periodic scans performed by Orbiter engine 330.

As another example of prioritizing acquisition of a new user's information, particular embodiments may fetch emails in reverse chronological order (i.e., newest first) in parallel with analyzing the contents of fetched emails. If all email criteria are met, then backend 220 does not need to immediately backscan the user's full set of emails that might be responsive to any cohort (but will do so later, e.g., during the periodic scan for cohort compliance). In addition or the alternative, scanning of email folders can be focused on, or limited to, looking for domains specified by a particular cohort. Each of these example approaches can be used with, or be used independently of, the example above that focuses first on demographic compliance with a cohort.

When a new cohort is added to cohorts 332, then Orbiter engine 330 must determine whether users of backend 220 qualify for the cohort. For instance, a new merchant may be introduced to backend 220, and this new merchant may have several different campaigns, and therefore several different cohorts for Orbiter engine to process. Because these cohorts are new, they have not been applied to any users. Therefore, Orbiter engine 330 performs a backscan 340 of users' email providers to determine which users of backend 220 qualify (or at least meet certain qualifications for) for any of the merchant's newly introduced cohorts. Such backscans may be limited in how far back into a user's historical email data Orbiter engine 330 considers; for example, Orbiter engine 330 may look back only as far as one or more rule(s) defining the cohort specify. For example, if one rule in a cohort specifies a condition in the past six months, and another rule in that cohort specifies a condition in the past two years, then two years of email data may be backscanned by Orbiter engine 330. In particular embodiments, a cohort may not include rules with any time limits, and therefore Orbiter engine 330 may impose a predetermined timeframe over which to backscan email from users' email providers. In particular embodiments, when one or more new cohorts are added to cohorts 332, then Orbiter engine 330 processes these cohorts at the predetermined, periodic time (e.g., nightly), unless a specific user first interacts with a UI element at a corresponding merchant's webpage, in which case Orbiter engine 330 performs a real-time scan for that particular user.

For existing cohorts, Orbiter engine 330 periodically (e.g., every 24 hours) re-scans database 318 for qualification with cohorts 332, and updates database 316 with the qualification results. Qualification for a cohort is dynamic and may change over time for a number of reasons, including the sunsetting of a cohort or because users' qualification for particular rules changes over time. For example, a user may age into or out of an age-based rule for a cohort, and/or may move into or out of a location-based rule for a cohort. As another example, a user may receive an email from one of a merchant's designated competitors, and therefore may qualify for a corresponding rule in a cohort for that merchant. As another example, a user may have received a discount from the merchant more recently than a cohort rule allows, but as time passes, the user's discount may age out of the cohort's specified recency requirements for receiving discounts, and therefore the user may qualify for the cohort (assuming other rules are met). Therefore, user groups 334 that meet individual cohort criteria may dynamically change over time, and Orbiter engine 330 periodically determines these updates. Unlike the backscan examples above, however, re-scanning an existing user for an existing cohort may not require backscanning the user's email inbox or re-checking for compliance with each rule in the cohort.

For example, suppose a user previously did not qualify for a campaign because the user was not in a location specified by a cohort for that campaign. If a user subsequently updates their location information (e.g., through an updated user response 322 or through an update to an account with backend 220), then this updated location information is stored in database 316 and propagated to database 318. Orbiter engine 330, e.g., running during its regular periodic scans, can then determine that the user now qualifies for the campaign, without performing any backscan of the user's data.

As another example, suppose a user previously did not qualify for a campaign because the user had not received an offer from a designated competitor or purchased a product from a designated competitor. If a user subsequently receives an email from a designated competitor, then this email is obtained during a fetch job (either as a result of a push notification from the email provider or as a result of a regularly scheduled email fetch). The relevant email is obtained by fetchers 310 and the email data 320 is passed to query database 318, as described above. Because the competitor domain is specified in an existing cohort 332, backend 220 parses the email data 320 from this domain as part of its regular email-data processing. Then Orbiter engine 330, e.g., running during its regular periodic scans, can determine that the user now qualifies for the campaign, and does not need to perform any backscan of the user's email to update the user group 334 for this cohort with this user.

While the two preceding examples relate to instances in which an existing user qualifies for an existing cohort over time, the same analysis applies when an existing user no longer qualifies for a cohort over time. In these instances, Orbiter engine 330 can dynamically update the user group 334 without having to perform a backscan of user data.

In particular embodiments, while backend 220 makes specific determinations about whether a user qualifies for a particular cohort and may store information about why the user did not qualify for a cohort (e.g., what information would need to change for the user to qualify), a merchant creating a campaign that corresponds to a cohort may not receive the identification of which criteria resulted in a user not qualifying for a cohort. Likewise, a merchant may not receive an identification of why a particular user qualified for a campaign that corresponds to a cohort that includes alternatives rules or criteria (e.g., a merchant may not receive an identification of which specific competitor a user may have received an email from, although that specific information may be determined by Orbiter engine 330 and stored by backend server, e.g., in database 316).

FIG. 4 illustrates an example method for determining whether a user qualifies for a cohort. Step 410 of the example method of FIG. 4 includes storing, in a query database of a backend system, and for each of a plurality of users, a set of user-supplied information in response to a set of one or more queries created by a merchant. For instance, as explained above, a form may be surfaced to a user the first time a user interacts with a UI element at a particular merchant, or when a new campaign for that merchant defines a cohort that includes demographic information of the user that was not previously requested.

Step 420 of the example method of FIG. 4 includes accessing, for each of the plurality of users, one or more email folders from one or more email accounts of the user. For example, as illustrated in FIG. 3A, backend 220 accesses email folders from email providers 302. Step 420 may occur before or after step 410.

Step 430 of the example method of FIG. 4 includes determining, for each of a plurality of emails in the one or more email folders, whether the email corresponds to one or more criteria in a cohort. For example, as illustrated in FIG. 3A, fetchers 310 obtain an email, and email data 320 is then parsed from the fetched emails to determine whether the email contains information that is responsive to one or more rules in a cohort (e.g., based on the domain of the email, the contents of the email, the email's read status, etc.).

Step 440 of the example method of FIG. 4 includes in response to a determination that an email corresponds to one or more criteria in a cohort, then storing, in the query database of the backend system and associated with an identity of the user, information in that email that corresponds to the one or more criteria in the cohort. For example, FIG. 3B illustrates that email data 320 responsive to a particular cohort is stored in query database 318, and may be stored in database 316, as well.

Step 450 of the example method of FIG. 4 includes determining, from the query database, whether each of a plurality of users of the backend system satisfy the criteria of each cohort of a plurality of cohorts of the backend system. For example, as explained above with reference to FIG. 3A and 3B, Orbiter engine 330 can determine user groups 334 for cohorts 332, e.g., based on periodically executing SQL searches based on the rules in cohorts 332 on query database 318, which is populated with user response 322, analytic events 326, and email data 320. Step 460 includes storing each set of users that satisfy a cohort as a group of users for that cohort; for example, in FIG. 3B, Orbiter engine 330 stores a determination of whether a user qualifies for a particular cohort in database 316. Step 460 can include identifying whether each user qualifies for or does not qualify for a particular cohort; the users' identities need not necessarily be stored together as a single group for each cohort.

Step 120 of the example method of FIG. 1 includes in response to a determination that the user qualifies for one or more merchant-specific campaigns, then dynamically generating (1) a campaign-specific offer code and (2) an associated expiration duration for the campaign-specific offer code. As illustrated in FIG. 2, backend 220 may perform step 120. If a user qualifies for more than one campaign for a given merchant, then a particular campaign may be selected based on merchant preference or based on determining the best corresponding offer (e.g., amount of savings), e.g., given the content of the user's cart. If the user does not qualify for any campaigns from the merchant, then that results may be communicated to the UI element, which may update to reflect the state (i.e., no campaign match) by saying something such as "You already have the best deal-check back next time for more savings!"

If the user qualifies for a campaign, as in step 120, and a particular campaign is identified, then backend 220 dynamically generates an offer code that is specific to the merchant whom the user is visiting. Backend servers also generate an expiration date or duration (e.g., an expiration of 5 minutes, 15 minutes, 2 hours, 24 hours etc.) for the dynamically generated offer code, and the expiration duration may be determined in advance (e.g., by the merchant). As a result, the dynamically generated code is valid only for the specified duration.

The offer code generated in step 120 is specific to a particular merchant campaign. Moreover, in particular embodiments, the generated code may be specific to the particular user, such that different users qualifying at the same time for the same merchant campaign may nevertheless receive different offer codes. In particular embodiments, the offer code may be unique to the user, in that the same valid offer code does not currently exist for that merchant. For instance, an offer code may be the user's first name, birthday, and a random string. By dynamically generating offer codes and ensuring that those codes are specific to a particular user, the process ensures that users who do not qualify for a campaign cannot illegitimately receive a valid offer code and obtain an offer that does not apply to them. For instance, if a merchant provides an offer code to users who attended a launch party for that merchant, then another user who did not attend the launch party may nevertheless obtain the offer code and enter that code, as the merchant has no way of subsequently determining whether a code is entered by the user attending the launch part or by another user. In contrast, in the techniques described herein, only the users qualifying for a campaign receive an offer code, and that offer code is both time-limited and is dynamically generated, and therefore illegitimate code usage is reduced or eliminated entirely, enabling a merchant to effectively engage in real-time personalized customized campaigns for its customers.

Step 125 of the example method of FIG. 1 includes updating an offer-code database of the merchant with (1) the dynamically generated campaign-specific offer code and (2) the expiration duration for the campaign-specific offer code. In other words, once an offer code is dynamically generated by backend 220, then backend 220 may transmit the dynamically generated offer code and the duration period to the merchant's offer-code database in merchant backend 210. In particular embodiments, the backend 220 may submit an API request for vendor, e.g., SHOPIFY, to create the dynamically generated offer code in the merchant's offer-code database. In other embodiments, backend 220 may have direct API access to the offer-code database of backend servers 210, and may update the database with the dynamically generated code and associated duration.

As a result of step 125, the merchant with whom the user is shopping now recognizes the offer code created for that user in response to the user qualifying for a particular campaign. Thus, the user can obtain the associated benefit(s) by entering the offer code via their client device 230 at the appropriate web content (e.g., an offer-code entry UI at the merchant's checkout page). In particular embodiments, entry of the dynamically generated offer code may occur automatically, so that the user does not need to enter the code, and in particular embodiments, may not even directly see the code, helping to ensure that the code cannot be illegitimately obtained by other users who did not necessarily qualify for the merchant's campaign corresponding to the dynamically generated offer code. For example, as discussed above, the UI element may poll backend 220 for state updates, and after step 120, backend 220 may send the dynamically generated offer code to the UI element, which may check the code against the code database of backend 210, and upon validating the offer code, the merchant's web content may automatically update to reflect entry of the valid offer code (e.g., by updating a cart or payment total, etc.). The appearance of the UI element may update to reflect the updated state of the offer-code generation process, e.g., the UI element may surface a text that say something like "You saved $X amount!" or "You saved Y % off!," where X and Y reflect the dollar or percentage savings, respectively. In particular embodiments, the user may know that they have received an offer, but may not know exactly why they received the offer, e.g., may not know which merchant campaign(s) they qualified for, nor which exact user information or attributes led to receiving the offer.

In particular embodiments, after entry of the dynamically generated offer code, a user can complete a transaction. In embodiments in which the offer code is surfaced to the user, then the user can return to the merchant at a later time (but still before the expiration of the offer code as specified by the code's duration, which may also be surfaced to the user) to complete the transaction. Once a user completes a transaction with a valid dynamically generated offer code, then server 210 or a related vendor (e.g., SHOPIFY) may send the transaction information (e.g., items purchased, the amount, the date/time, the user ID, etc.) to backend 220, and this information may be stored in, e.g., databases 316 and/or 318.

Figure 5:
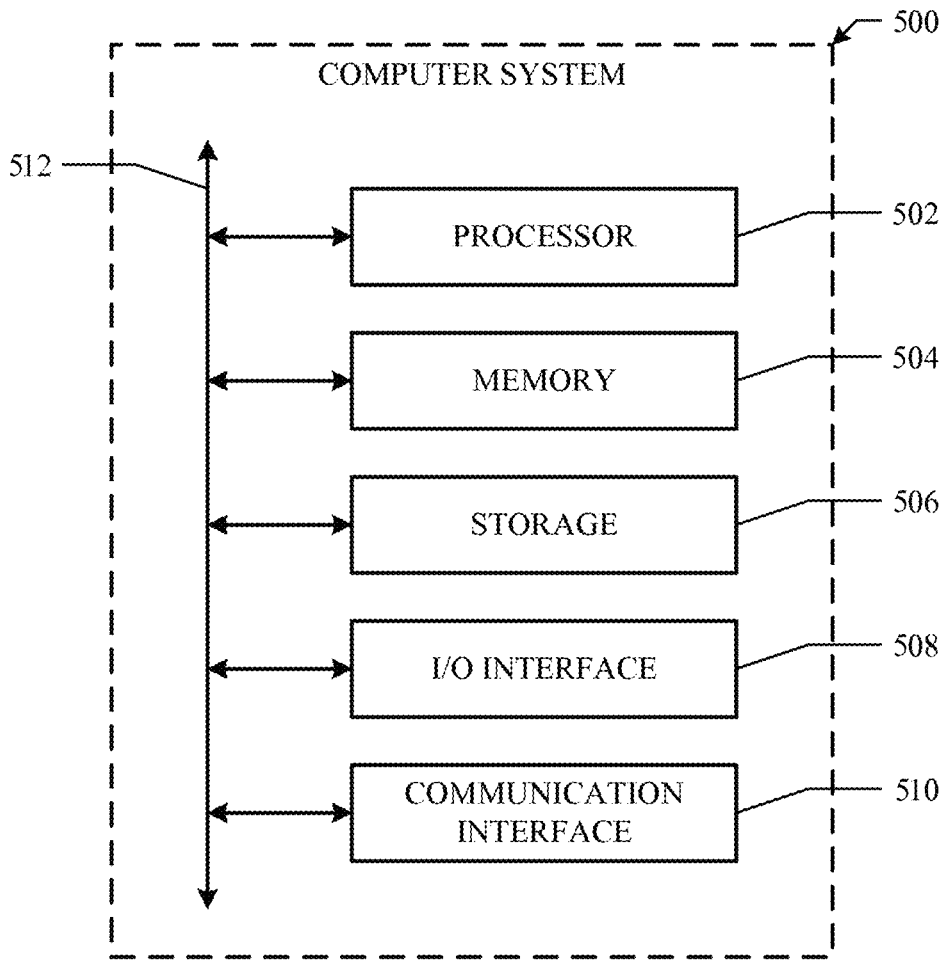
FIG. 5 illustrates an example computing system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

Herein, references to one or more server devices performing some functionality or being capable of performing some functionality contemplates that at least one of the server devices must perform the functionality or be capable of performing the functionality. In other words, the server devices collectively, not necessarily individually, must perform or be capable of performing all the recited functionality.

What is claimed is:

1. A method comprising:

providing, by a backend server of a merchant, to a client device of a user, a stateful, interactive user interface (UI) element on an HTML webpage of the merchant, wherein the backend server of the merchant provides HTML content that defines a document object model that defines the UI element to the client device;

receiving, at a service-provider backend system comprising of one or more processors that is separate from the merchant, an identification that the user has interacted with the UI element;

in response to the identification that the user has interacted with the UI element on the HTML webpage of the merchant, determining, by the backend system and based on a profile of the user, whether the user qualifies for one or more merchant-specific campaigns associated with the merchant;

updating, after the user has interacted with the UI element and prior to generating an offer code for the user, an appearance of the UI element on the HTML webpage of the merchant to reflect a state of an offer-code generation process, wherein the updated UI element is defined by the document object model that is defined by the HTML content served by the backend server of the merchant;

in response to a determination that the user qualifies for one or more merchant-specific campaigns, then dynamically generating (1) a campaign-specific, user-specific offer code and (2) an associated expiration duration for the campaign-specific, user-specific offer code; and updating an offer-code database of the merchant with (1) the dynamically generated campaign-specific, user-specific offer code and (2) the expiration duration for the campaign-specific, user-specific offer code.

2. The method of claim 1, wherein the interactive UI element further comprises a polling process that communicates with an API endpoint of the backend system to update the state of the offer-code generation process.

3. The method of claim 1, wherein updating the state of the UI element with the status associated with the method comprises:

in response to the identification that the user has interacted with the UI element, then updating a graphical presentation of the UI element; and in response to dynamically generating the campaign-specific, user-specific offer code, then further updating the graphical presentation of the UI element.

4. The method of claim 1, wherein the profile of the user comprises a set of user-supplied information in response to a set of one or more queries created by the merchant.

5. The method of claim 4, further comprising providing, to the client device of the user and in response to the identification that the user has interacted with the UI element, the set of one or more queries created by the merchant.

6. The method of claim 4, wherein the profile of the user further comprises email data obtained from one or more scans of one or more email accounts of the user with one or more email providers.

7. The method of claim 1, further comprising in response to the identification that the user has interacted with the UI element, then authenticating an identity of the user.

8. The method of claim 1, wherein the campaign-specific, user-specific offer code is unique to the user's interaction with the stateful, interactive element.

9. The method of claim 1, further comprising updating the webpage of the merchant with an entry of the campaign-specific, user-specific offer code, without surfacing the campaign-specific, user-specific offer code on a display of the client device of the user.

10. A system comprising:

a client device of a user configured to receive, from a backend server of a merchant, and display a stateful, interactive user interface (UI) element on an HTML webpage of the merchant, wherein the backend server of the merchant provides HTML content that defines a document object model that defines the UI element to the client device; and a service-provider backend that is separate from the merchant, comprising of one or more server devices configured to:

receive, from the client device, an identification that the user has interacted with the UI element;

in response to the identification that the user has interacted with the UI element on the HTML webpage of the merchant, determine, based on a profile of the user, whether the user qualifies for one or more merchant-specific campaigns associated with the merchant;

update, after the user has interacted with the UI element and prior to generating an offer code for the user, an appearance of the UI element on the HTML webpage of the merchant to reflect a state of an offer-code generation process, wherein the updated UI element is defined by the document object model that is defined by the HTML content served by the backend server of the merchant;

in response to a determination that the user qualifies for one or more merchant-specific campaigns, then dynamically generate (1) a campaign-specific, user-specific offer code and (2) an associated expiration duration for the campaign-specific, user-specific offer code; and update an offer-code database of the backend server of the merchant with (1) the dynamically generated campaign-specific, user-specific offer code and (2) the expiration duration for the campaign-specific, user-specific offer code.

11. The system of claim 10, wherein the interactive UI element further comprises a polling process that communicates with an API endpoint of the service-provider backend to update the state of the offer-code generation process.

12. The system of claim 10, wherein the one or more server devices of the merchant backend are further configured to update the state of the UI element with the status associated with the offer-code generation process by:

in response to the identification that the user has interacted with the UI element, then update a graphical presentation of the UI element; and in response to dynamically generating the campaign-specific, user-specific offer code, then further update the graphical presentation of the UI element.

13. The system of claim 10, wherein the profile of the user comprises a set of user-supplied information in response to a set of one or more queries created by the merchant.

14. The system of claim 13, wherein the one or more server devices of the merchant backend are further configured to provide, to the client device of the user and in response to the identification that the user has interacted with the UI element, the set of one or more queries created by the merchant.

15. The system of claim 13, wherein the profile of the user further comprises email data obtained from one or more scans of one or more email accounts of the user with one or more email providers.

16. The system of claim 10, wherein the one or more server devices of the merchant backend are further configured to, in response to the identification that the user has interacted with the UI element, authenticate an identity of the user.

17. The system of claim 10, wherein the one or more server devices of the merchant backend are further configured to dynamically generate a user-specific offer code that is unique to the user's interaction with the stateful, interactive element.

18. The system of claim 10, wherein the client device is further configured to update the webpage of the merchant with an entry of the campaign-specific, user-specific offer code, without surfacing the campaign-specific, user-specific offer code on a display of the client device.

19. One or more non-transitory computer readable storage media storing instructions that are operable when executed to:

receive, at a backend system comprising of one or more processors that is separate from a merchant, an identification that a user has interacted with a stateful, interactive user interface (UI) element provided to a client device of a user on an HTML webpage of the merchant, wherein a backend server of the merchant provides HTML content that defines a document object model that defines the UI element to the client device;

in response to the identification that the user has interacted with the UI element on HTML webpage of the merchant, determine, by the backend system and based on a profile of the user, whether the user qualifies for one or more merchant-specific campaigns associated with the merchant;

update, after the user has interacted with the UI element and prior to generating an offer code for the user, an appearance of the UI element on the HTML webpage of the merchant to reflect a state of an offer-code generation process, wherein the updated UI element is defined by the document object model that is defined by the HTML content served by the backend server of the merchant;

in response to a determination that the user qualifies for one or more merchant-specific campaigns, then dynamically generating (1) a campaign-specific, user-specific offer code and (2) an associated expiration duration for the campaign-specific, user-specific offer code; and update an offer-code database of the merchant with (1) the dynamically generated campaign-specific, user-specific offer code and (2) the expiration duration for the campaign-specific, user-specific offer code.

20. The media of claim 19, wherein the media further comprises instructions that are operable when executed to dynamically generate a user-specific offer code that is unique to the user's interaction with the stateful, interactive element.

* * * * *